| (12) | United States Patent<br>Lee et al. | (10) Patent No.: US 8,436,551 B2<br>(45) Date of Patent: May 7, 2013 |

| (54) | ARC DISCHARGE DETECTING CIRCUIT, LIGHT SOURCE DRIVING APPARATUS HAVING THE SAME AND METHOD OF DRIVING A LIGHT SOURCE USING THE SAME |
| --- | --- |
| (75) | Inventors: Jong-Jae Lee, Asan-si (KR); Hyeon-Yong Jang, Osan-si (KR) |
| (73) | Assignee: Samsung Display Co., Ltd. (KR) |
| ( * ) | Notice: Subject to any disclaimer, the term of this patent is extended or adjusted under 35 U.S.C. 154(b) by 333 days. |
| (21) | Appl. No.: 12/963,801 |
| (22) | Filed: Dec. 9, 2010 |
| (65) | Prior Publication Data<br>US 2011/0175541 A1 Jul. 21, 2011 |
| (51) | Int. Cl.<br>*G05F 1/00* (2006.01) |
| (52) | U.S. Cl.<br>USPC ........... 315/291; 315/274; 315/312; 315/282; 315/247 |
| (58) | Field of Classification Search .......... 315/274–279, 315/282, 247, 224, 209 R, 291, 307–311, 315/312–326<br>See application file for complete search history. |

(56) References Cited

U.S. PATENT DOCUMENTS

2002/0071670 A1\* 6/2002 Odaka et al. ................... 396/206
2012/0306402 A1\* 12/2012 Csikszentimrei ............. 315/282

\* cited by examiner

*Primary Examiner* — Tuyet Thi Vo
(74) *Attorney, Agent, or Firm* — Cantor Colburn LLP

(57) ABSTRACT

An arc discharge detecting circuit includes; a voltage dividing part which divides a driving voltage provided to a light source, a detecting part which includes a loop-shaped wiring spaced apart from the voltage dividing part and which detects a current corresponding to an arc discharge flowing through the voltage dividing part using a coupling capacitance generated between the loop-shaped wiring of the detecting part and a wiring of the voltage dividing part, and an output part connected to the detecting part to output a detection voltage corresponding to the arc discharge. Accordingly, the arc discharge detecting circuit may improve a sensitivity of detecting an arc discharge as a current source type using the coupling capacitors, a design may be simplified, and manufacturing costs may be decreased.

20 Claims, 5 Drawing Sheets

ARC DISCHARGE DETECTING CIRCUIT, LIGHT SOURCE DRIVING APPARATUS HAVING THE SAME AND METHOD OF DRIVING A LIGHT SOURCE USING THE SAME

This application claims priority to Korean Patent Application No. 2010-3757, filed on Jan. 15, 2010, and all the benefits accruing therefrom under 35 U.S.C. §119, the content of which in its entirety are herein incorporated by reference.

BACKGROUND OF THE INVENTION

1. Field of the Invention

Exemplary embodiments of the present invention relate to an arc discharge detecting circuit, a light source driving apparatus having the arc discharge detecting circuit and a method of driving a light source using the arc discharge detecting circuit. More particularly, exemplary embodiments of the present invention relate to a current-source type arc discharge detecting circuit, a light source driving apparatus having the arc discharge detecting circuit and a method of driving a light source using the arch discharge detecting circuit.

2. Description of the Related Art

Generally, in a liquid crystal display ("LCD") apparatus, a light source generates light for displaying an image on an LCD panel. For example, the light source may be a fluorescent lamp such as a cold cathode fluorescent lamp ("CCFL"), an external electrode fluorescent lamp ("EEFL") or a flat fluorescent lamp ("FFL"), a light-emitting diode ("LED"), or various other types of light sources.

A driving part for driving the light source typically converts a direct current ("DC") voltage into an alternating current ("AC") voltage according to a luminance-control voltage provided from an outside source, and provides a lamp with the converted voltage to turn the lamp on and to control a luminance of the lamp. In addition, the driving part detects a current flowing through the lamp and controls the converted voltage provided to the lamp based on the detected current thereof.

When the fluorescent lamp is used as the light source for the LCD apparatus, the driving part provides the fluorescent lamp with a high voltage to initially turn the fluorescent lamp on, e.g., the fluorescent lamp is provided with a high voltage start-up voltage. When a terminal of the lamp receiving the high voltage is not properly insulated or a contact resistance is generated between the terminal of the lamp and the driving part, an undesirable arc discharge may be generated. The arc discharge may have negative effects on an operation of a backlight assembly and may further possibly cause a fire or a smoke. In addition, the fluorescent lamp generally uses mercury (Hg) inside, so that the arc discharge may also cause environmental pollution via release of the internal mercury.

For preventing the arc discharge, after the driving part is manufactured, an inspector typically visually inspects an electric contact between the lamp and an electrode or alternatively to, or in addition to, visual inspection an arc discharge detecting circuit may be included within the display to stop an operation of the driving part when the arc discharge is generated.

The arc discharge detecting circuit typically used is connected at each of both electrodes of the fluorescent lamp, e.g., the positive and negative terminals thereof, so that the arc discharge detecting circuit is complicated and includes multiple duplicated parts. In addition, a voltage provided to the fluorescent lamp is divided by capacitors connected to both the electrodes and a voltage detected at the capacitors is output from the divided voltage at the capacitors to detect the arc discharge. Therefore, the detected voltage output from the divided voltage at the capacitors may have a low voltage level, and thus the arc discharge may be hard to detect.

BRIEF SUMMARY OF THE INVENTION

Exemplary embodiments of the present invention provide an arc discharge detecting circuit capable of outputting a detection voltage corresponding to a current source and which is capable of simplifying a design thereof.

Exemplary embodiments of the present invention also provide a light source driving apparatus having the above-mentioned circuit.

Exemplary embodiments of the present invention also provide a method of driving a light source using the above-mentioned circuit.

According to one aspect of the present invention, an exemplary embodiment of an arc discharge detecting circuit includes a voltage dividing part, a detecting part and an output part. The voltage dividing part divides a driving voltage provided to a light source. The detecting part includes a loop-shaped wiring spaced apart from the voltage dividing part and detects a current corresponding to an arc discharge flowing through the voltage dividing part using a coupling capacitance generated between the loop-shaped wiring of the detecting part and a wiring of the voltage dividing part. The output part is connected to the detecting part to output a detection voltage corresponding to the arc discharge.

In an exemplary embodiment, the current corresponding to the arc discharge may include a high frequency component, and the detecting part may pass the high frequency component of the current flowing through the voltage dividing part using the coupling capacitance to detect the arc discharge.

In an exemplary embodiment, the output part may include a diode and an output capacitor. The diode may rectify the current corresponding to the arc discharge applied from a first end of the detecting part. The output capacitor may include a first terminal connected to a second end of the detecting part, and a second terminal connected to the diode and output the rectified arc discharge current as the detection voltage.

In an exemplary embodiment, the voltage dividing part may include a plurality of resistors connected to the light source in series. Alternative exemplary embodiments include configurations wherein the voltage dividing part may include a plurality of capacitors connected to the light source in series.

In an exemplary embodiment, the arc discharge detecting circuit may be disposed on a printed circuit board ("PCB"). The detecting part may include a copper (Cu) wiring that is spaced apart from the wiring of the voltage dividing part by a predetermined distance.

According to another aspect of the present invention, an exemplary embodiment of a light source driving apparatus includes an arc discharge detecting circuit and a driving part. The an arc discharge detecting circuit includes a voltage dividing part which divides a driving voltage provided to a light source, a detecting part including a loop-shaped wiring spaced apart from the voltage dividing part and which detects a current corresponding to an arc discharge flowing through the voltage dividing part using a coupling capacitance generated between the loop-shaped wiring of the detecting part and a wiring of the voltage dividing part, and an output part connected to the detecting part to output the arc discharge as a detection voltage. The driving part controls a driving voltage provided to the light source based on the detection voltage.

In an exemplary embodiment, the driving part may block the driving voltage, when the detective voltage is one of equal to and greater than a reference voltage.

In an exemplary embodiment, the driving part may include a first transformer, a second transformer and a control part. The first transformer may provide a first driving voltage to a first electrode of the light source. The second transformer may provide a second driving voltage to a second electrode of the light source, the second driving voltage having a phase substantially opposite to, i.e., 180 degrees out of phase with, that of the first driving voltage. The control part may block the first and second driving voltages, when the detective voltage is one of equal to and greater than a reference voltage.

In an exemplary embodiment, the arc discharge detecting circuit and the driving part may be disposed on a same substrate. The detecting part may include a copper (Cu) wiring that is spaced apart from the wiring of the voltage dividing part by a predetermined distance. The arc discharge detecting circuit may be disposed on a PCB.

In an exemplary embodiment, the current corresponding to the arc discharge may include a high frequency component, and the detecting part may pass the high frequency component of the current flowing through the voltage dividing part using the coupling capacitance to detect the arc discharge of the current.

In an exemplary embodiment, the output part may include a diode and an output capacitor. The diode may rectify the current corresponding to the arc discharge o applied from a first end of the detecting part. The output capacitor may include a first terminal connected to a second end of the detecting part, and a second terminal connected to the diode and which outputs a rectified arc discharge current as the detective voltage.

In an exemplary embodiment, the voltage dividing part may include a plurality of resistors connected to the light source in series. Alternative exemplary embodiments include configurations wherein the voltage dividing part may include a plurality of capacitors connected to the light source in series.

According to still another aspect of the present invention, an exemplary embodiment of a method of driving a light source is provided as follows. A driving voltage provided to a light source is divided by a voltage dividing part. A current corresponding to an arc discharge flowing through the voltage dividing part is detected using a coupling capacitance generated between the voltage dividing part and a detecting part including a loop-shaped wiring spaced apart from the voltage dividing part. The current corresponding to the arc discharge of the current is output as a detection voltage. A driving voltage provided to the light source is controlled based on the detection voltage.

In an exemplary embodiment, the driving voltage provided to the light source may be controlled such that the driving voltage may be blocked when the detective voltage is one of equal to and greater than the reference voltage.

In an exemplary embodiment, the current corresponding to the arc discharge may be rectified. A rectified current corresponding to the arc discharge, also referred to as a rectified arc discharge current, may be output as the detection voltage.

According to the present invention, the detection voltage is output using the coupling capacitance, so that a sensitivity for detecting the arc fault may be increased. In addition, the arc discharge detecting circuit may be formed on the PCB on which the light source driving apparatus is formed, so that a design may be simplified and costs may be reduced.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
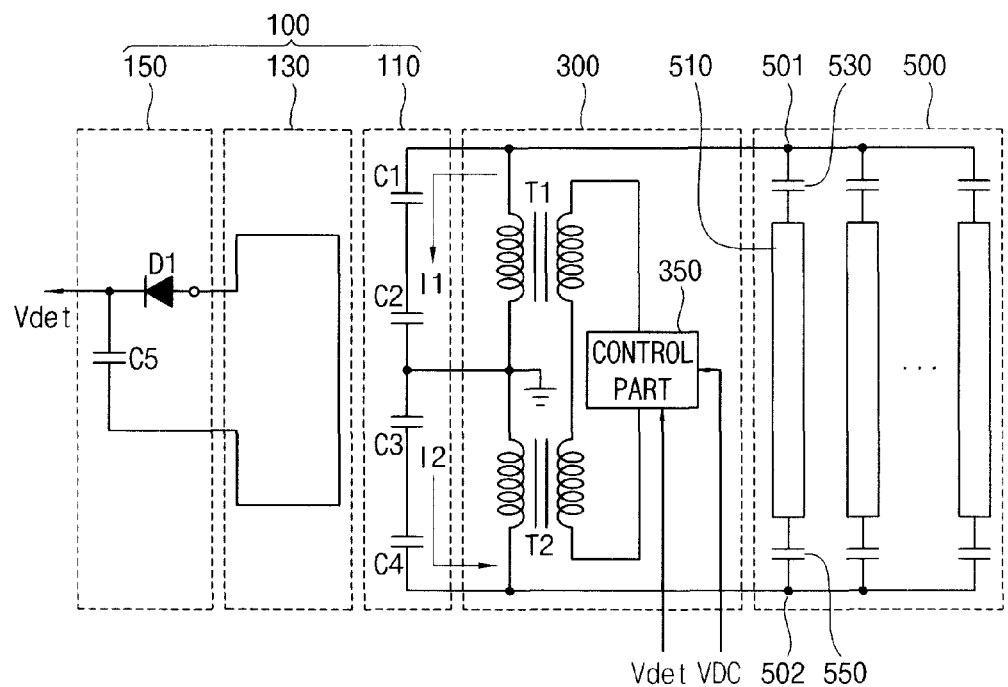
FIG. 1 is a an equivalent circuit diagram of an exemplary embodiment of a light source driving apparatus according to the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

FIG. 1 is an equivalent circuit diagram of an exemplary embodiment of a light source driving apparatus according to the present invention.

Referring to FIG. 1, the present exemplary embodiment of a light source driving apparatus includes an arc discharge detecting circuit 100 and a driving part 300.

Furthermore, a light source part 500 is also illustrated in FIG. 1, for convenience of understanding. The light source part 500 receives a driving voltage from the driving part 300 and generates light. The light source part 500 may include at least one individual light source 510. In one exemplary embodiment, wherein the light source part 500 includes a plurality of the light sources 510, the light sources 510 may be arranged in parallel. In one exemplary embodiment, the light source 510 may be a fluorescent lamp, for example, a cold cathode fluorescent lamp ("CCFL").

An individual light source of the plurality of light sources 510 includes a first electrode 501 and a second electrode 502 respectively connected to opposing terminals thereof. The driving voltage is provided to the first and second electrodes 501 and 502, and thus the light source 510 is turned on to emit light. In one exemplary embodiment, the driving voltage may be a sine wave.

In the present exemplary embodiment, the light source part 500 has a balanced-capacitance structure including a capacitor 530 connected between the first electrode 501 and the light source 510 and a capacitor 550 connected between the second electrode 502 and the light source 510. The capacitors 530 and 550 of the balanced-capacitance structure may uniformly provide the light source part 500 with the driving voltage in parallel. For example, in one exemplary embodiment capacitances of the capacitors 530 and 550 may be about 22 pF.

The driving part 300 provides the driving voltage to the light source part 500. The light source part 500 is turned on/off and a luminance of the light source part 500 is controlled according to the application of the driving voltage. The driving part 300 includes a first transformer T1, a second transformer T2 and a control part 350. The control part 350 modulates a pulse-width of an externally provided direct current ("DC") control voltage VDC and converts the control voltage VDC into an alternating current ("AC") voltage, and then the control part 350 provides the AC voltage to the first and second transformers T1 and T2.

The first and second transformers T1 and T2 boost the AC voltage based on a coil turn ratio thereof to provide the boosted AC voltage to the light source part 500. For example, the first transformer T1 boosts the AC voltage provided from the control part 350 to provide the boosted AC voltage to the first electrode 501. The second transformer T2 boosts the AC voltage provided from the control part 350 to provide the boosted AC voltage to the second electrode 502. In one exemplary embodiment, the driving voltage provided to the first electrode 501 and the driving voltage provided to the second electrode 502 may have substantially the same amplitude with each other and may have phases reversed with each other, e.g., the AC voltages applied to the opposite electrodes 501 and 502 may be 180 degrees out of phase.

However, in a situation wherein the driving voltage is applied and a connection between the first or second transformer T1 or T2 and the first or second electrode 501 or 502 is faulty, e.g., due to a manufacturing defect, etc., an arc discharge ARC may be generated near the first or second electrode 501 or 502. Alternatively, when the first or second electrode 501 or 502 is not properly electrically insulated, the arc discharge ARC may be generated between the first or second electrode 501 or 502 and another element, such as a casing for the light source part 500, etc.

When the arc discharge ARC is generated, the driving voltage provided to the light source part 500 may be unstable and may include a large amount of high frequency noise. A noise caused by the arc discharge ARC has a frequency much higher than the driving voltage. For example, in one exemplary embodiment, the frequency of the driving voltage may be about 48 kHz and the frequency of the arc discharge ARC may be equal to or greater than about 3 MHz.

According to the present exemplary embodiment, the control part 350 of the driving part 300 may block the driving voltage provided to the light source part 500 based on a detection voltage Vdet provided from the arc discharge detecting circuit 100, when the arc discharge ARC occurs. Thus, in the present exemplary embodiment, the driving part 300 may cut off voltage application to the light source part 500 when an arc discharge ARC event occurs, thereby preventing undesirable further arcing.

For example, in one exemplary embodiment the control part 350 turns the light source part 500 off when the detection voltage Vdet is equal to or greater than a reference voltage. In other words, the control part 350 maintains a lighting of the light source part 500 when the detection voltage Vdet is less than the reference voltage. The reference voltage may be provided from the outside, e.g., predetermined during manufacturing of the control part 350, or may be set by the control part 350. One of ordinary skill in the art would appreciate that this is but one configuration utilizing the detection voltage Vdet, and that alternative exemplary embodiments may include a configuration wherein the control part 350 maintains a lighting of the light source part 500 only when the detection voltage is greater than the reference voltage, depending upon the configuration of the arc discharge detecting circuit 100.

The arc discharge detecting circuit 100 includes a voltage dividing part 110, a detecting part 130 and an output part 150. The arc discharge detecting circuit 100 detects the arc discharge ARC, e.g., the high frequency noise due to the arcing event, included in the driving voltage and outputs the detection voltage Vdet corresponding to the arc discharge ARC. The detection voltage Vdet is provided to the control part 350 and is used to determine whether the light source part 500 is turned on or turned off.

The voltage dividing part 110 divides the driving voltage provided to the light source 510 and determines whether an overvoltage is provided to the light source part 500. In one exemplary embodiment, the voltage dividing part 110 may be connected between the first electrode 501 and the second electrode 502. Alternative exemplary embodiments include configurations wherein the voltage dividing part 110 may be connected to each of the first and second electrodes 501 and 502. When the voltage dividing part 110 is connected between the first electrode 501 and the second electrode 502, a virtual ground may be formed at a center of the voltage dividing part 110. When the voltage dividing part 110 is connected to each of the first and second electrodes 501 and 502, the virtual ground may be connected to the voltage dividing part 110 that is connected to each of the first and second electrodes 501 and 502.

The voltage dividing part 110 may include a plurality of capacitors C1, C2, C3 and C4 that are connected to the first and second electrodes 501 and 502 in series.

The detecting part 130 includes a loop-shaped wiring spaced apart from the voltage dividing part 110; specifically, the loop-shaped wiring of the detecting part 130 is not electrically connected with the voltage-dividing part 110. The detecting part 130 detects a current flowing through the voltage dividing part 110 due to the arc discharge ARC by a coupling capacitor effect generated between the loop-shaped wiring of the detecting part 130 and a wiring of the voltage dividing part 110. The detecting part 130 will be described later in further detail with reference to FIGS. 2 to 7.

The output part 150 outputs a voltage corresponding to the arc discharge ARC detected from the detecting part 130 as a detection voltage Vdet. The output part 150 is connected to the loop-shaped wiring of the detecting part 130. In the present exemplary embodiment the output part 150 includes a diode D1 and an output capacitor C5.

As will be described in more detail with respect to FIG. 2, the diode D1 includes a first node A receiving the current corresponding to the arc discharge ARC from a first end of the detecting part 130 and a second node B outputting a rectified arc discharge ARC of the current. In the present exemplary embodiment the diode D1 may pass a half of the arc discharge ARC in one direction in what is referred to as half-wave rectification.

The output capacitor C5 includes a first terminal connected to a second end of the detecting part 130 and a second terminal connected to the second node B of the diode D1. In one exemplary embodiment, the first terminal of the output capacitor C5 may be connected to the virtual ground. The second terminal of the output capacitor C5 that is connected to a second node B outputting the rectified arc discharge ARC outputs the rectified arc discharge ARC as the detection voltage Vdet.

The detection voltage Vdet is provided to the control part 350 of the driving part 300. The control part 350 blocks the driving voltage provided to the light source part 500 when the detection voltage Vdet is equal to or greater than the reference voltage.

Although not shown in the figures, an alternative exemplary embodiment includes a configuration wherein the output part 150 may further include an amplifier that amplifies the detection voltage Vdet.

In one exemplary embodiment, the arc discharge detecting circuit 100 and the driving part 300 may be formed on the same substrate. For example, the driving part 300 may be formed on a printed circuit board ("PCB"), and the PCB may be disposed on a lower surface of a receiving container receiving the light source part 500 in a liquid crystal display ("LCD") apparatus.

In one exemplary embodiment, the arc discharge detecting circuit 100 and the driving part 300 may be integrally formed on the PCB. In one exemplary embodiment, the arc discharge detecting part 130 may be a copper (Cu) wiring that has the loop-shape and is spaced apart from the wiring of the voltage dividing part 110 by a predetermined distance.

Figure 2:
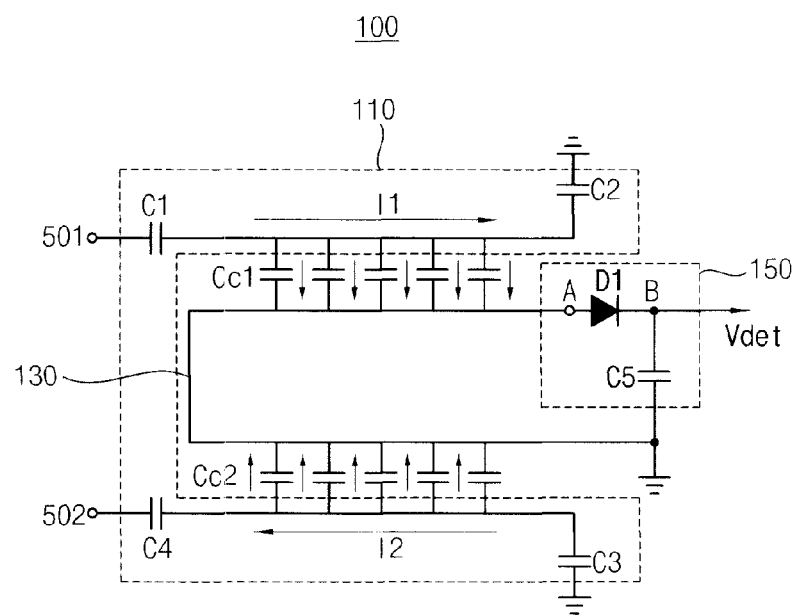
FIG. 2 is an equivalent circuit diagram of an exemplary embodiment of an arc discharge detecting circuit of FIG. 1.
Figure 3:
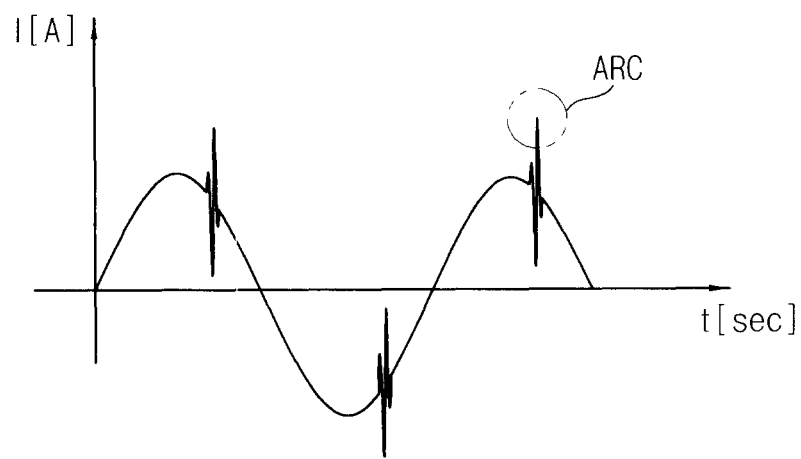
FIG. 3 is a waveform diagram of a current flowing between an exemplary embodiment of a first electrode and a voltage dividing part of FIG. 2.
Figure 4:
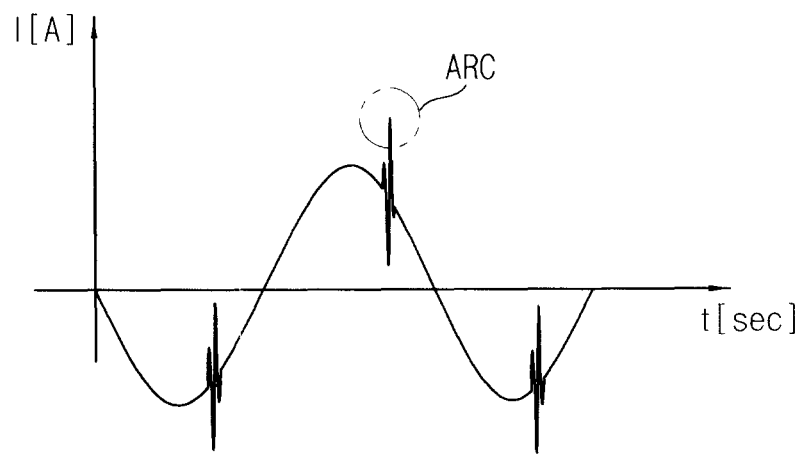
FIG. 4 is a waveform diagram of a current flowing between an exemplary embodiment of a second electrode and a voltage dividing part of FIG. 2.
Figure 5:
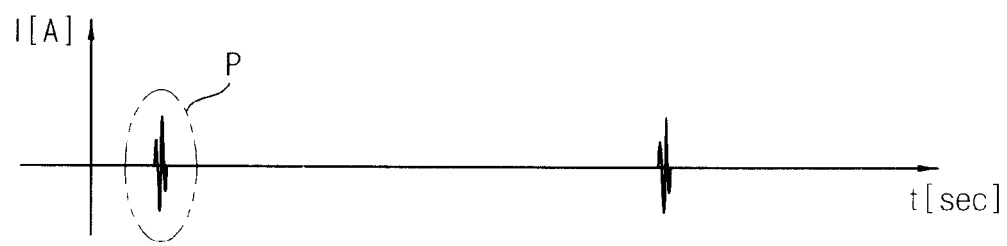
FIG. 5 is a waveform diagram of a current at node 'A' of FIG. 2.
Figure 6:
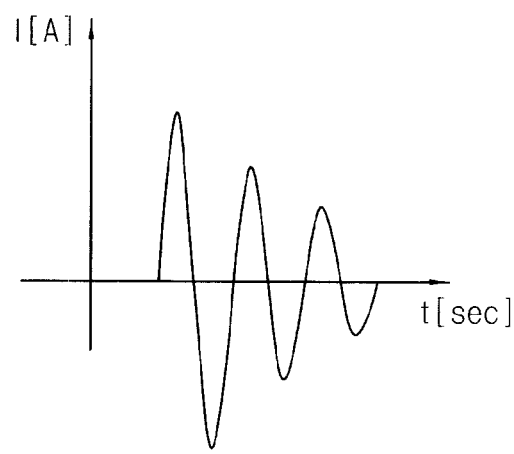
FIG. 6 is an enlarged waveform diagram of a portion 'P' of FIG. 5.
Figure 7:
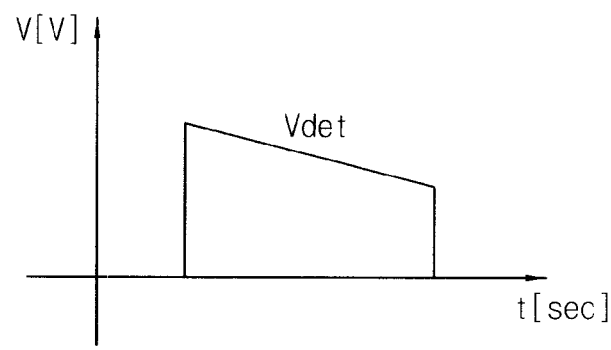
FIG. 7 is a waveform diagram of a detected voltage at a node 'B' of FIG. 2.

FIG. 2 is an equivalent circuit diagram of an exemplary embodiment of an arc discharge detecting circuit of FIG. 1. FIG. 3 is a waveform diagram of a current flowing between a first electrode 501 and a voltage dividing part 110 of FIG. 2. FIG. 4 is a waveform diagram of a current flowing between a second electrode 502 and a voltage dividing part 110 of FIG. 2. FIG. 5 is a waveform diagram of a current at a node 'A' of FIG. 2. FIG. 6 is an enlarged waveform diagram of a portion 'P' of FIG. 5. FIG. 7 is a waveform diagram of a detection voltage at a node 'B' of FIG. 2.

Referring to FIGS. 2 to 7, virtual coupling capacitors Cc1 and Cc2 are connected between the loop-shaped wiring of the detecting part 130 and the wiring of the voltage dividing part 110.

When the driving part 300 provides the driving voltage to the light source part 500, the current flows through the voltage dividing part 110 and the driving voltage is divided by the capacitors C1, C2, C3 and C4 included in the voltage dividing part 110.

For example, in one exemplary embodiment a first current I1 flows through the voltage dividing part 110 that is connected to the first electrode 501, and a second current I2 flows through the voltage dividing part 110 that is connected to the second electrode 502.

As shown in FIGS. 3 and 4, the first and second currents I1 and I2 may be sine waves and may have substantially the same amplitude and the phases thereof may be reversed with respect to one other, e.g., the phases of the sine waves may be 180 degrees apart from one another. When the connection or the insulation of the first or second electrode 501 or 502 is faulty, the high frequency noise due to the arc discharge ARC may be included in the first or second current I1 or I2. The frequency of the arc discharge ARC is very high as described above.

The detecting part 130 includes the loop-shaped wiring spaced apart from the voltage dividing part 110. The detecting part 130 is spaced apart from the voltage dividing part 110 by a predetermined distance and is not physically connected to the voltage dividing part 110. The detecting part 130 may be wiring formed on the PCB, and thus the virtual coupling capacitors Cc1 and Cc2 are connected between the loop-shaped wiring of the detecting part 130 and the wiring of the voltage dividing part 110.

The virtual coupling capacitors Cc1 and Cc2 pass a high frequency of the current flowing through the voltage dividing part 110 to detect the arc discharge ARC included in the current. The passing of such high frequency current is also referred to as high-pass filtering.

Capacitances of the virtual coupling capacitors Cc1 and Cc2 are much lower than those of the capacitors C1, C2, C3 and C4 included in the voltage dividing part 110. Accordingly, the coupling capacitors Cc1 and Cc2 pass only the high frequency included in the current when the arc discharge ARC is generated, so that only the arc discharge ARC may be detected.

For example, the arc discharge ARC included in the first current I1 is detected at the detecting part 130 adjacent to the wiring of the voltage dividing part 110 connected to the first electrode 501. In addition, the arc discharge ARC included in the second current I2 is detected at the detecting part 130 adjacent to the wiring of the voltage dividing part 110 connected to the second electrode 502.

The detecting part 130 detects the arc discharge ARC from the current flowing through the voltage dividing part 110 connected to the first and second electrodes 501 and 502, so that the detecting part 130 may detect the arc discharge ARC even though the arc discharge occurs at either the first electrode 501 or the second electrode 502, or possibly both.

As shown in FIGS. 5 and 6, the arc discharge ARC detected by the detecting part 130 is provided to the first node A of the diode D1 as a current source.

The diode D1 rectifies the current corresponding to the arc discharge ARC to output the rectified current corresponding to the arc discharge ARC to the second node B. For example, in one exemplary embodiment the diode D1 may pass a half of the current corresponding to the arc discharge ARC in one direction. Such passing of half a current may also be referred to as half-wave rectification.

As shown in FIG. 7, the rectified current of the arc discharge ARC charges the output capacitor C5 and is output at the second node B as the detection voltage Vdet.

A source of the outputted detection voltage Vdet is the current flowing through the voltage dividing part 110, so that the detection voltage Vdet may have an amplitude higher than that of the detection voltage detected via a conventional method of detecting the arc discharge from the divided voltage. Therefore, a very small amount of arc discharge caused by an infinitesimal gap of the first or second electrode 501 or 502 may also be effectively detected.

Figure 8:
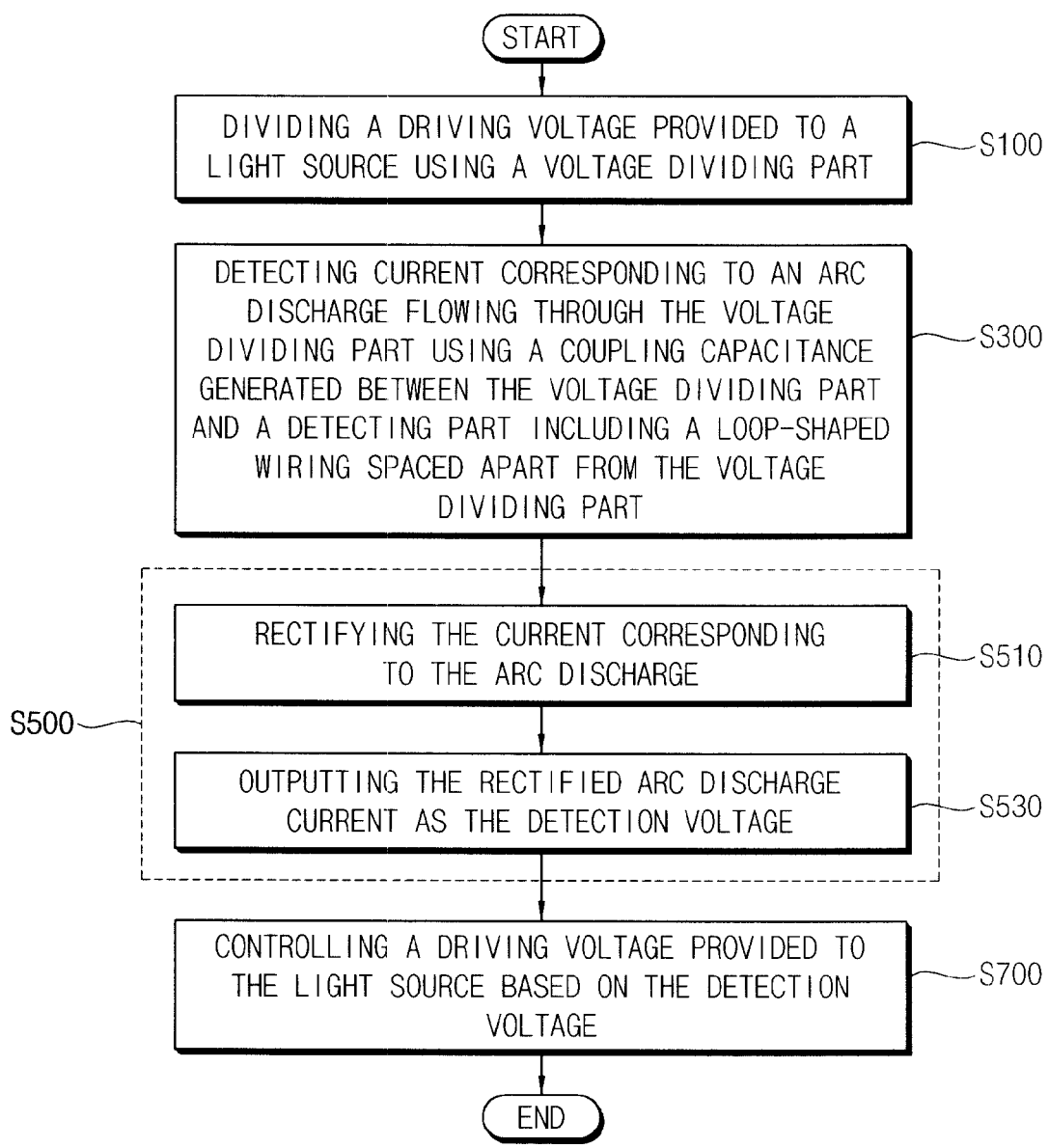
FIG. 8 is a flowchart explaining an exemplary embodiment of a method of driving an exemplary embodiment of a light source using the exemplary embodiment of an arc discharge detecting circuit of FIG. 1.

FIG. 8 is a flowchart explaining an exemplary embodiment of a method of driving a light source using the exemplary embodiment of an arc discharge detecting circuit of FIG. 1.

Referring to FIGS. 1 to 8, in the present exemplary embodiment of a method of driving the light source, the voltage dividing part 110 divides the driving voltage provided to the light source 510 (step S100).

In one exemplary embodiment the voltage dividing part 110 may be connected between the first electrode 501 and the second electrode 502 of the light source 510. Alternative exemplary embodiments include configurations wherein the voltage dividing part 110 may be connected to each of the first and second electrodes 501 and 502.

In one exemplary embodiment the voltage dividing part 110 may include the capacitors C1, C2, C3 and C4 that are connected to the first and second electrodes 501 and 502 in series. Alternative exemplary embodiments include configurations wherein the voltage dividing part 110 may include a plurality of resistors (discussed in more detail with respect to FIG. 9) that are connected to the first and second electrodes 501 and 502 in series.

The detecting part 130 detects the current corresponding to an arc discharge ARC flowing through the voltage dividing part 110 using virtual coupling capacitors Cc1 and Cc2 that are generated between the voltage dividing part 110 and the detecting part 130 including the loop-shaped wiring spaced apart from the voltage dividing part 110 (step S300).

The detecting part 130 is spaced apart from the voltage dividing part 110 by the predetermined distance and is not physically connected to the voltage dividing part 110. In one exemplary embodiment the detecting part 130 may be the wiring formed on the PCB, and thus the coupling capacitors Cc1 and Cc2 are connected between the loop-shaped wiring of the detecting part 130 and the wiring of the voltage dividing part 110. The virtual coupling capacitors Cc1 and Cc2 pass a high frequency component of the current, in a process also referred to as high-pass filtering, flowing through the voltage dividing part 110 to detect the arc discharge ARC included in the current.

The output part 150 outputs the current corresponding to the arc discharge ARC as the detection voltage Vdet (step S500). The output part 150 is connected to the loop-shaped wiring of the detecting part 130.

Outputting the arc discharge ARC as the detection voltage Vdet (step S500) includes rectifying the current corresponding to the arc discharge ARC (step S510) using the diode D1 and outputting the rectified arc discharge ARC as the detection voltage Vdet using the output capacitor C5 (step S530).

The control part 350 controls the driving voltage provided to the light source part 500 based on the outputted detection voltage Vdet (step S700).

The control part 350 turns the light source part 500 off or maintains the lighting of the light source part 500 by comparing the detection voltage Vdet to the reference voltage. The control part 350 may block the driving voltage provided to the light source part 500 when the detection voltage Vdet is equal to or greater than the reference voltage. Exemplary embodiments include configurations wherein the reference voltage may be provided from the outside or may be set by the control part 350.

Figure 9:
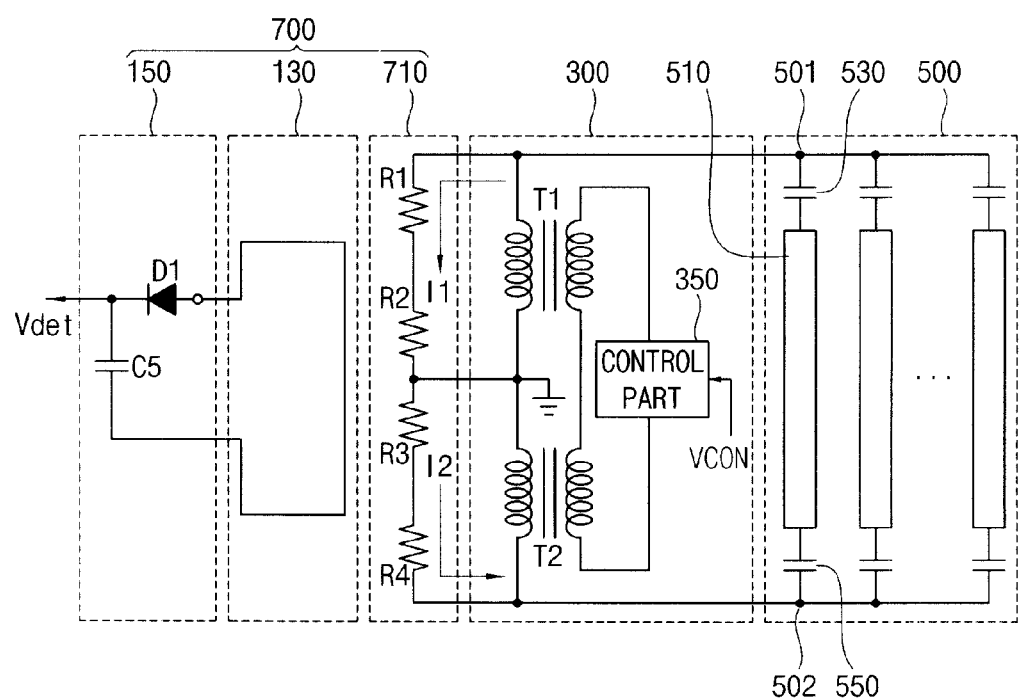
FIG. 9 is an equivalent circuit diagram of another exemplary embodiment of a light source driving apparatus according to the present invention.

FIG. 9 is an equivalent circuit diagram of another exemplary embodiment of a light source driving apparatus according to the present invention.

Referring to FIG. 9, the present exemplary embodiment of a light source driving apparatus includes an arc discharge detecting circuit 700 and a driving part 300. The present exemplary embodiment of a light source driving apparatus is substantially similar to the previous exemplary embodiment of a light source driving apparatus as described with respect to FIG. 1, except for a voltage dividing part 710. Thus, the same reference numerals will be used to refer to the same or like parts as those described in the previous example embodiment in FIG. 1 and any further repetitive explanation concerning the above elements will be omitted. In addition, an exemplary embodiment of a method of driving a light source of the present exemplary embodiment of a light source driving apparatus is substantially the same as the previously described exemplary embodiment of a method as illustrated in FIG. 8, thus any further repetitive explanation will be omitted.

In the present example embodiment, the voltage dividing part 710 includes a plurality of resistors R1, R2, R3 and R4 that is connected to the first and second electrodes 501 and 502 in series. The voltage dividing part 710 divides the driving voltage provided to the first and second electrodes 501 and 502 and determines whether an overvoltage is provided to the light source part 500.

In one exemplary embodiment, the voltage dividing part 710 may be connected between the first electrode 501 and the second electrode 502. Alternative exemplary embodiments include configurations wherein the voltage dividing part 710 may be connected to each of the first and second electrodes 501 and 502. When the voltage dividing part 710 is connected between the first electrode 501 and the second electrode 502, a virtual ground may be formed at a center of the voltage dividing part 710. When the voltage dividing part 710 is connected to each of the first and second electrodes 501 and 502, the virtual ground may be connected to the voltage dividing part 710 that is connected to each of the first and second electrodes 501 and 502.

The present exemplary embodiment of a light source driving apparatus may change the resistance of the resistors R1, R2, R3 and R4, so that a level of the current flowing through the voltage dividing part 710 may be adjustable. Therefore, the detection voltage Vdet may be adjustable, so that the arc discharge may be detected with a high sensitivity.

According to the present invention, the arc discharge detecting circuit may improve a sensitivity of detecting the arc discharge as the current source type using the coupling capacitors, so that reliability may be improved.

In addition, the arc discharge detecting circuit may detect the arc discharge ARC generated at either the first or second electrode 501 or 502, so that the arc discharge detecting circuit may be simplified.

Further, the arc discharge detecting circuit may be a loop-shaped pattern implemented on the PCB, so that a design for the arc discharge detecting circuit may be simplified and an extra cost may not be required.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures.

Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. An arc discharge detecting circuit comprising:
    a voltage dividing part which divides a driving voltage provided to a light source;
    a detecting part which includes a loop-shaped wiring spaced apart from the voltage dividing part, and which detects a current corresponding to an arc discharge flowing through the voltage dividing part using a coupling capacitance between the loop-shaped wiring of the detecting part and a wiring of the voltage dividing part; and
    an output part connected to the detecting part to output a detection voltage corresponding to the arc discharge.

2. The arc discharge detecting circuit of claim 1, wherein a current corresponding to the arc discharge comprises a high frequency component, and the detecting part passes the high frequency component of the current flowing through the voltage dividing part using the coupling capacitance to detect the current of the arc discharge.

3. The arc discharge detecting circuit of claim 1, wherein the output part comprises:
    a diode which rectifies the current corresponding to the arc discharge applied from a first end of the detecting part; and
    an output capacitor which includes a first terminal connected to a second end of the detecting part, and a second terminal connected to the diode and which outputs the rectified arc discharge current as the detection voltage.

4. The arc discharge detecting circuit of claim 1, wherein the voltage dividing part comprises a plurality of resistors connected to the light source in series.

5. The arc discharge detecting circuit of claim 1, wherein the voltage dividing part comprises a plurality of capacitors connected to the light source in series.

6. The arc discharge detecting circuit of claim 1, wherein the arc discharge detecting circuit is disposed on a printed circuit board.

7. The arc discharge detecting circuit of claim 6, wherein the detecting part comprises a copper wiring spaced apart from the wiring of the voltage dividing part by a predetermined distance.

8. A light source driving apparatus comprising:
    an arc discharge detecting circuit comprising:
        a voltage dividing part which divides a driving voltage provided to a light source; and
        a detecting part comprising:
            a loop-shaped wiring spaced apart from the voltage dividing part and which detects a current corresponding to an arc discharge flowing through the voltage dividing part using a coupling capacitance generated between the loop-shaped wiring of the detecting part and a wiring of the voltage dividing part; and
            an output part connected to the detecting part and which outputs a detection voltage corresponding to the arc discharge; and
    a driving part which controls a driving voltage provided to the light source based on the detection voltage.

9. The light source driving apparatus of claim 8, wherein the driving part blocks the driving voltage when the detection voltage is one of equal to and greater than a reference voltage.

10. The light source driving apparatus of claim 8, wherein the driving part comprises:
   a first transformer which provides a first driving voltage to a first electrode of the light source;
   a second transformer which provides a second driving voltage to a second electrode of the light source, the second driving voltage having a phase substantially opposite to that of the first driving voltage; and
   a control part which blocks the first driving voltage and the second driving voltage when the detection voltage is one of equal to and greater than a reference voltage.

11. The light source driving apparatus of claim 8, wherein the arc discharge detecting circuit and the driving part are disposed on a same substrate.

12. The light source driving apparatus of claim 8, wherein the detecting part comprises a copper wiring spaced apart from the wiring of the voltage dividing part by a predetermined distance.

13. The light source driving apparatus of claim 12, wherein the arc discharge detecting circuit is disposed on a printed circuit board.

14. The light source driving apparatus of claim 8, wherein the current corresponding to the arc discharge comprises a high frequency component, and the detecting part passes the high frequency component of the current flowing through the voltage dividing part using the coupling capacitance to detect the arc discharge of the current.

15. The light source driving apparatus of claim 8, wherein the output part comprises:
   a diode which rectifies the current corresponding to the arc discharge applied from a first end of the detecting part; and
   an output capacitor including a first terminal connected to a second end of the detecting part, and a second terminal connected to the diode and which outputs a rectified arc discharge current as the detection voltage.

16. The light source driving apparatus of claim 8, wherein the voltage dividing part comprises a plurality of resistors connected to the light source in series.

17. The light source driving apparatus of claim 8, wherein the voltage dividing part comprises a plurality of capacitors connected to the light source in series.

18. A method of driving a light source, the method comprising:
   dividing a driving voltage provided to a light source using a voltage dividing part;
   detecting current corresponding to an arc discharge flowing through the voltage dividing part using a coupling capacitance generated between the voltage dividing part and a detecting part including a loop-shaped wiring spaced apart from the voltage dividing part;
   outputting the current corresponding to the arc discharge as a detection voltage; and
   controlling a driving voltage provided to the light source based on the detection voltage.

19. The method of claim 18, wherein controlling the driving voltage provided to the light source based on the detection voltage comprises:
   blocking the driving voltage when the detection voltage is one of equal to and greater than a reference voltage.

20. The method of claim 18, wherein outputting the current corresponding to the arc discharge as the detection voltage comprises:
   rectifying the current corresponding to the arc discharge; and
   outputting the rectified arc discharge current as the detection voltage.

* * * * *